(12) United States Patent
Yamasaki et al.

(10) Patent No.: US 11,283,370 B2
(45) Date of Patent: Mar. 22, 2022

(54) VIBRATION WAVE MOTOR AND DRIVING DEVICE INCLUDING THE VIBRATION WAVE MOTOR

(71) Applicant: CANON KABUSHIKI KAISHA, Tokyo (JP)

(72) Inventors: Ryo Yamasaki, Tokyo (JP); Makoto Oikawa, Yokohama (JP); Kazuharu Osawa, Kawasaki (JP); Shunsuke Ninomiya, Yokohama (JP); Ryo Abe, Funabashi (JP); Kenta Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 16/275,110

(22) Filed: Feb. 13, 2019

(65) Prior Publication Data
US 2019/0253001 A1 Aug. 15, 2019

(30) Foreign Application Priority Data
Feb. 15, 2018 (JP) .............................. JP2018-024868

(51) Int. Cl.
| | | |
|---|---|---|
| G02B 7/04 | (2021.01) | |
| H02N 2/02 | (2006.01) | |
| G03B 13/32 | (2021.01) | |
| H02N 2/00 | (2006.01) | |
| H02N 2/10 | (2006.01) | |

(52) U.S. Cl.
CPC .............. H02N 2/026 (2013.01); G02B 7/04 (2013.01); G03B 13/32 (2013.01); H02N 2/006 (2013.01); H02N 2/0065 (2013.01); H02N 2/103 (2013.01)

(58) Field of Classification Search
CPC ...... H02N 2/026; H02N 2/006; H02N 2/0065; H02N 2/103; G02B 7/04; G03B 13/32
USPC .......................................................... 359/823
See application file for complete search history.

(56) References Cited

U.S. PATENT DOCUMENTS 5,264,753 A * 11/1993 Mukohjima ........... H02N 2/163
310/323.05
2016/0352258 A1* 12/2016 Nishitani ............. H02N 2/0085

FOREIGN PATENT DOCUMENTS

| JP | 2008-172995 A | 7/2008 |
|---|---|---|
| JP | 2009-268236 A | 11/2009 |
| JP | 2014-212682 A | 11/2014 |
| JP | 2016-82802 A | 5/2016 |
| JP | 2017-022957 A | 1/2017 |

* cited by examiner

*Primary Examiner* — James R Greece
(74) *Attorney, Agent, or Firm* — Canon U.S.A., Inc., IP Division

(57) ABSTRACT

Provided is a vibration wave motor, including: a vibrator; a friction member, which is in friction contact with the vibrator; a pressurizing unit, which is configured to pressurize the vibrator against the friction member; and a guiding unit, which is configured to guide relative movement between the vibrator and the friction member, wherein the relative movement between the vibrator and the friction member is caused by vibration generated by the vibrator, and wherein the guiding unit holds the friction member and has fixing portions, and the fixing portions are formed in the guiding unit in vicinities of both ends of the guiding unit sandwiching the friction member.

8 Claims, 6 Drawing Sheets

VIBRATION WAVE MOTOR AND DRIVING DEVICE INCLUDING THE VIBRATION WAVE MOTOR

BACKGROUND OF THE INVENTION

Field

The present disclosure relates to a vibration wave motor and a driving device including the vibration wave motor.

Description of the Related Art

A driving device including an ultrasonic motor, which is disclosed in Japanese Patent Application Laid-Open No. 2016-82802, includes an optical lens and a guide bar. The optical lens, which is a target to be driven, and the guide bar are provided to a lens holding member. The optical lens is linearly guided by the guide bar. The ultrasonic motor is fixed to a motor holding member with four screws, and the lens holding member is coupled to the ultrasonic motor through intermediation of a driving-force coupling member.

However, a flange portion is required to be provided so as to fix the ultrasonic motor. Therefore, the driving device is disadvantageously increased in size. At the same time, the four screws are required to fix the ultrasonic motor, and hence the number of components is increased to undesirably increase cost.

SUMMARY OF THE INVENTION

According to one embodiment, there is provided a vibration wave motor including: a vibrator; a friction member, which is in friction contact with the vibrator; a pressurizing unit configured to pressurize the vibrator against the friction member; and a guiding unit configured to guide relative movement between the vibrator and the friction member, wherein the relative movement between the vibrator and the friction member is caused by vibration generated by the vibrator, and wherein the guiding unit holds the friction member and has fixing portions, and the fixing portions are formed in the guiding unit in vicinities of both ends of the guiding unit sandwiching the friction member.

Further features of the present disclosure will become apparent from the following description of exemplary embodiments with reference to the attached drawings.

DESCRIPTION OF THE EMBODIMENTS

First Embodiment

Figure 1:
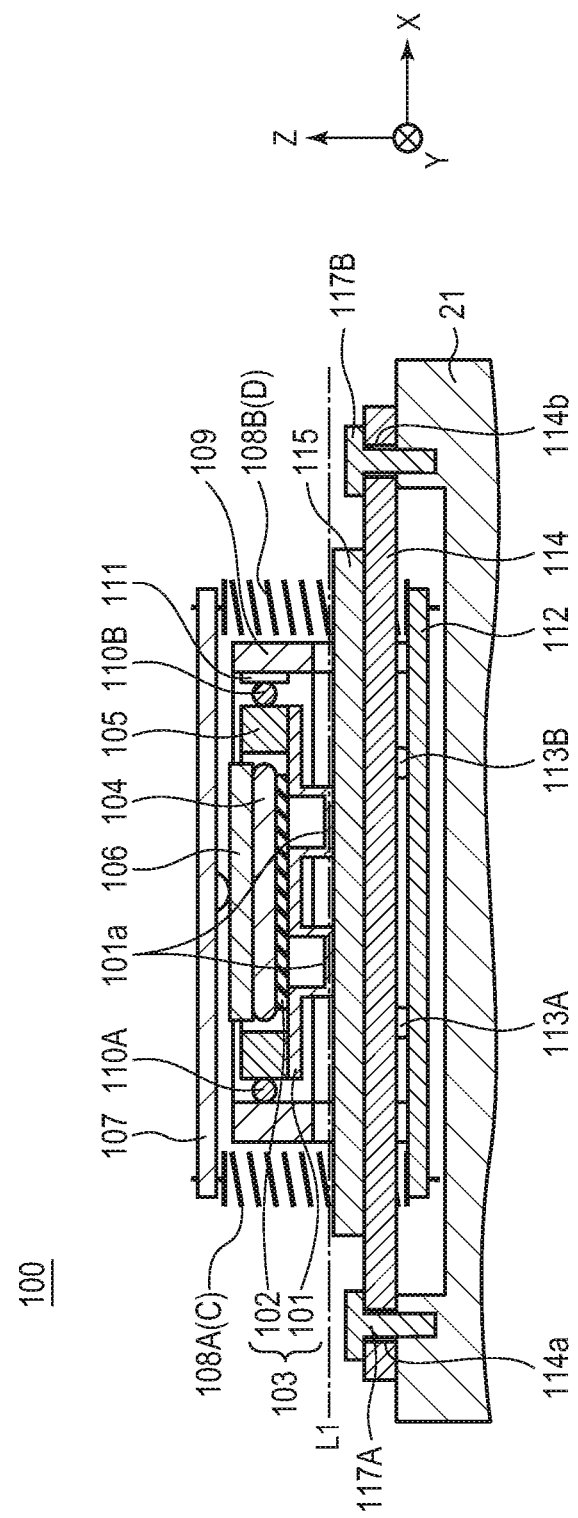
FIG. 1 is a sectional view of a vibration wave motor (100) according to a first embodiment as seen in a Y-axis direction.
Figure 2:
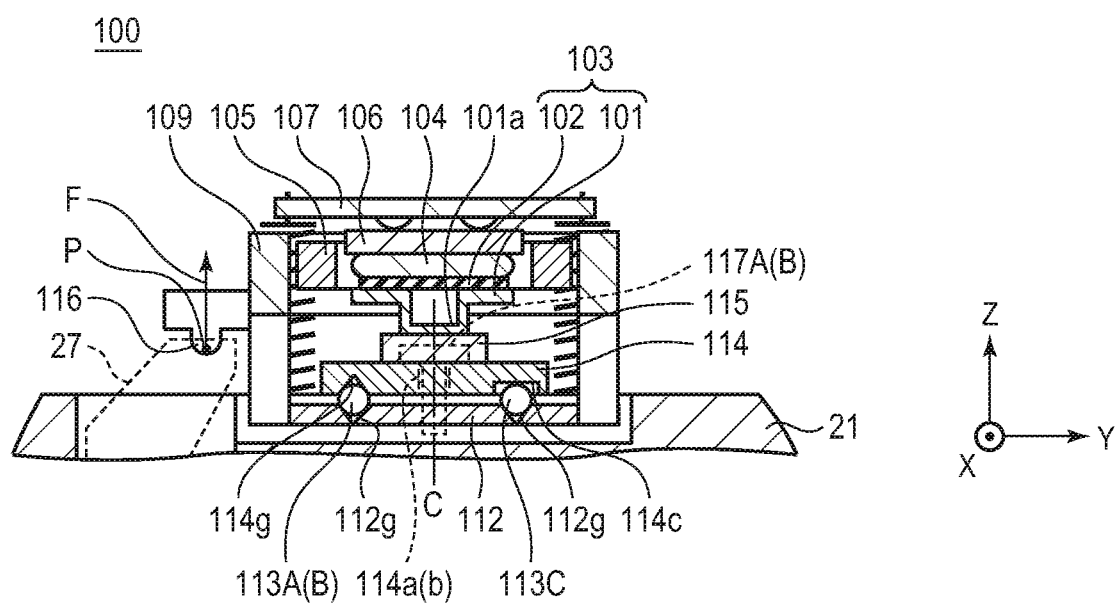
FIG. 2 is a sectional view of the vibration wave motor (100) according to the first embodiment as seen in an X-axis direction.
Figure 3:
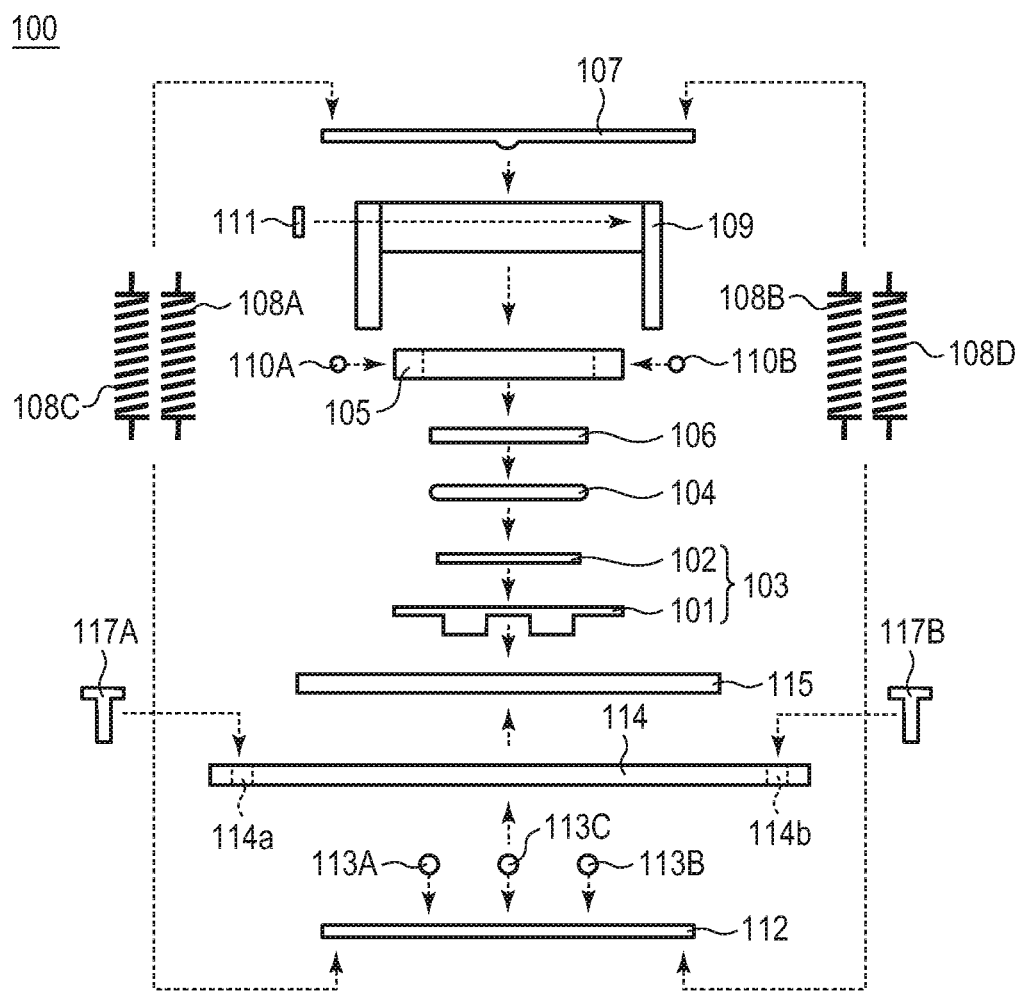
FIG. 3 is an exploded diagram of the vibration wave motor (100) according to the first embodiment.

Preferred embodiments of the present disclosure will now be described in detail in accordance with the accompanying drawings. In FIG. 1 to FIG. 3, a configuration of a vibration wave motor 100 (ultrasonic motor) according to a first embodiment is illustrated. When an XYZ coordinate system is defined as illustrated in FIG. 1 to FIG. 3, FIG. 1 is a sectional view when the vibration wave motor 100 is seen in a Y-axis direction. FIG. 2 is a sectional view when the vibration wave motor 100 is seen in an X-axis direction. FIG. 3 is an exploded diagram of the vibration wave motor 100. The configuration of the vibration wave motor 100 is described with reference to FIG. 1 to FIG. 3.

The vibration wave motor 100 according to the first embodiment includes a vibrator 103. The vibrator 103 includes a vibrating body 101 and a piezoelectric element 102. The vibrating body 101 and the piezoelectric element 102 are firmly bonded to each other through such as an adhesive. The vibrating body 101 includes two projecting portions 101a along a direction of relative movement (X-axis direction). The two projecting portions 101a are in friction contact with a friction member 115 described later.

The vibrator 103 is entirely held by a first holding member 105. A vibration block member 104 is arranged on the upper side of the piezoelectric element 102 in a Z-axis direction. The vibration block member 104 is configured to prevent transmission of vibration generated by the vibrator 103 to another member that is provided on the upper side of the vibration block member 104 in the Z-axis direction. As the vibration block member 104, a member made of fiber such as felt is frequently used.

A first transmission member 106 and a second transmission member 107, which are configured to transmit pressurizing forces for pressurizing the vibrator 103 against the friction member 115, are arranged on the upper side of the vibration block member 104 in the Z-axis direction. The pressurizing forces are generated by pressurizing springs 108A, 108B, 108C, and 108D, respectively. The pressurizing springs 108A, 108B, 108C, and 108D are formed of four tension coil springs, respectively. The first transmission member 106, the second transmission member 107, and the pressurizing springs 108A, 108B, 108C, and 108D serve as a pressurizing unit and correspond to a pressurizing unit in the claims.

The vibration wave motor 100 further includes a second holding member 109, which is configured to hold the first holding member 105. Rolling rollers 110A and 110B and an anti-backlash spring 111 are provided between the second holding member 109 and the first holding member 105. The second holding member 109 and the first holding member 105 are coupled to each other in the X-axis direction without backlash. At the same time, the first holding member 105 is held so as to be movable in the Z-axis direction relative to the second holding member 109.

A guiding unit includes a movable-side guiding member 112, three rolling balls 113A, 113B, and 113C, and a fixed-side guiding member 114. The movable-side guiding member 112 has guide grooves 112g, which are configured to hold the three rolling balls 113A, 113B, and 113C therein, respectively, and is coupled to the second holding member 109. The movable-side guiding member 112 is movable in the direction of relative movement together with the vibrator 103.

Meanwhile, the fixed-side guiding member 114 is arranged so as to be opposed to the movable-side guiding member 112 through intermediation of the three rolling balls 113A, 113B, and 113C therebetween. The fixed-side guiding member 114 has guide grooves 114g and a guiding portion 114c. The guide grooves 114g are configured to hold the rolling balls 113A and 113B therein, respectively. The guiding portion 114c has a rectangular cross section and is configured to guide the rolling ball 113C. The friction member 115 is held onto the fixed-side guiding member 114 with such as bonding, a double-sided tape, or a screw.

The three rolling balls 113A, 113B, and 113C are sandwiched between the fixed-side guiding member 114 and the movable-side guiding member 112 with the pressurizing forces of the pressurizing springs 108A, 108B, 108C, and 108D. The movable-side guiding member 112 corresponds to a first guiding member in the claims and the fixed-side guiding member 114 corresponds to a second guiding member in the claims. The movable-side guiding member 112, the fixed-side guiding member 114, and the rolling balls 113A, 113B, and 113C correspond to a guiding unit in the claims.

The friction member 115 has a friction contact surface that is held in contact with the vibrator 103 as an upper surface in the Z-axis direction. A lower surface of the friction member 115 is held in contact with the fixed-side guiding member 114 and is held on the fixed-side guiding member 114. The vibrator 103 is guided so as to be movable in the X-axis direction relative to the friction member 115 by the movable-side guiding member 112, the fixed-side guiding member 114, and the rolling balls 113A, 113B, and 113C.

Through holes are formed as fixing portions 114a and 114b in the fixed-side guiding member 114. The fixing portions 114a and 114b are formed in the guiding unit in the vicinities of both ends of the guiding unit so as to be located on both sides of the friction member 115 in the X-axis direction on the sectional view of FIG. 1. Further, the fixing portions 114a and 114b are formed in the vicinity of a straight line L1 that connects distal ends of the two projecting portions 101a. The vibration wave motor 100 is fixed by inserting a fixing screw 117A into the fixing portion 114a and a fixing screw 117B into the fixing portion 114b so that the fixed-side guiding member 114 is fixed to a lens barrel 21 provided inside a focus unit 20 described later. At this time, the fixing screws 117A and 117B are provided in the vicinity of a center (center line C) of the vibration wave motor 100 in the Y-axis direction as indicated by the dotted line of FIG. 2.

The vibration wave motor 100 includes a power extraction portion 116 provided to the second holding member 109. A driven unit, which serves as a target to be driven, is coupled to the power extraction portion 116, thereby enabling linear drive. In FIG. 2, a state in which a coupling member 27 is coupled to the power extraction portion 116 is indicated by the dotted line. Details thereof are described later.

The vibration wave motor 100 according to the first embodiment is configured as described above. The vibrator 103 is moved relatively on the friction member 115 in the X-axis direction by ultrasonic vibration (high-frequency vibration at a frequency falling within an ultrasonic range) generated by the vibrator 103. In this manner, the linear drive is achieved. Although a flexible printed board configured to supply a driving voltage and a driving circuit configured to generate the driving voltage are arranged in practice in the piezoelectric element 102 of the vibrator 103, illustration and description thereof are herein omitted.

The vibration wave motor 100 according to the first embodiment is fixed to the lens barrel 21 by inserting the two fixing screws 117A and 117B into the fixing portions 114a and 114b of the fixed-side guiding member 114, respectively. Therefore, the vibration wave motor 100 can be fixed with a compact structure. Further, the number of components can be reduced as compared to those of related-art structures. Thus, the vibration wave motor 100 according to the first embodiment has an excellent effect in cost reduction.

Second Embodiment

Figure 4:
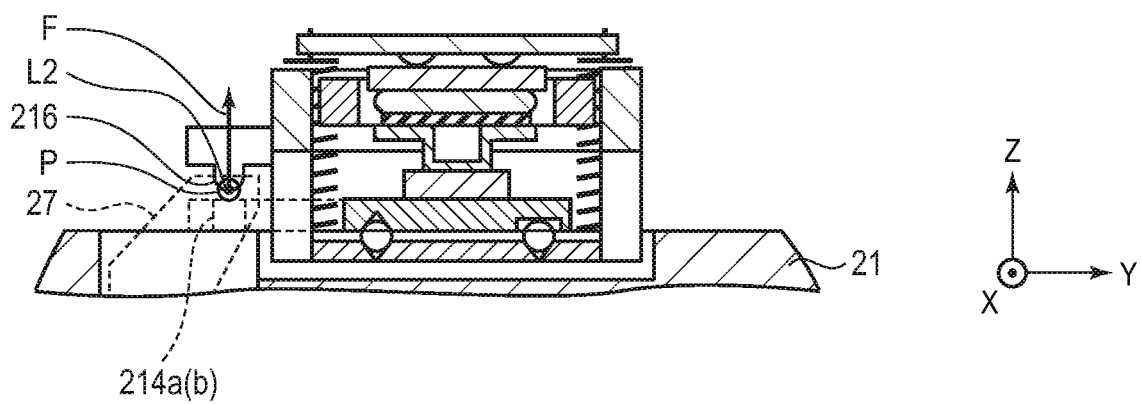
FIG. 4 is a sectional view of a vibration wave motor (200) according to a second embodiment as seen in the X-axis direction.

In comparison to the first embodiment, the vibration wave motor 100 can be more stably fixed to the lens barrel 21 in a second embodiment. FIG. 4 is a sectional view of a vibration wave motor 200 according to the second embodiment as seen in the X-axis direction and corresponds to FIG. 2 of the first embodiment. In FIG. 4, the coupling member 27 has a turning force that allows counterclockwise turning about a rotary shaft 27a (see FIG. 6). Therefore, at a point P which is a coupling position between the coupling member 27 and a power extraction portion 216, a coupling force F indicated by the arrow acts in a direction parallel to the Z axis. In the second embodiment, when a line (line in a direction vertical to a paper plane of FIG. 4) which is parallel to the direction of relative movement (X-axis direction) and passes through the point P is defined as a straight line L2, fixing portions 214a and 214b are formed below the straight line L2 in the Z-axis direction or in the vicinity of the straight line L2. In FIG. 4, for avoiding complication of the drawing, illustration of fixing screws 217A and 217B is omitted. The vibration wave motor 200 according to the second embodiment has the same effects as those of the vibration wave motor 100 according to the first embodiment and additionally has excellent effects described below.

In the first embodiment, as illustrated in FIG. 2, the fixing portions 114a and 114b are arranged at the positions shifted in the Y-axis direction with respect to the coupling force F (arranged in the vicinity of the center line C). Therefore, a clockwise moment is generated at the fixing portions 114a and 114b by the turning force of the coupling member 27. In the second embodiment, however, the fixing portions 214a and 214b are arranged below the straight line L2 in the Z-axis direction. Therefore, no moment is generated at the fixing portions 214a and 214b. Thus, the effect of enabling more stable fixation of the vibration wave motor 200 can be obtained. Although the fixing portions 214a and 214b are provided below the straight line L2 in the Z-axis direction in the second embodiment, a generated moment is extremely small even when the positions of the fixing portions 214a and 214 are shifted from the straight line L2 but are still positioned in the vicinity of the straight line L2. Therefore, the same effect can be obtained.

Further, the coupling force F is required to be set in accordance with a weight of the lens holding member 22 (driven unit) including a lens group 12 described later. Therefore, when the weight of the driven unit is large, the coupling force F is also required to be set large. With the arrangement of the fixing portions 214a and 214b as in the second embodiment, however, stable fixation can be achieved independently of the weight of the driven unit. Further, along with a current increase in focusing speed, the vibration wave motor 200 is required to be driven at a high speed. For the high-speed drive, the vibration wave motor 200 is required to be driven with acceleration and deceleration at a frequency falling within a high frequency band. Therefore, it is important to stably fix the vibration wave motor 200 to prevent occurrence of unnecessary resonance in the entire focus unit 20. Even from the above-mentioned point of view, a remarkable effect can be obtained with the arrangement of the fixing portions 214a and 214b as in the second embodiment.

Application Example

Figure 5:
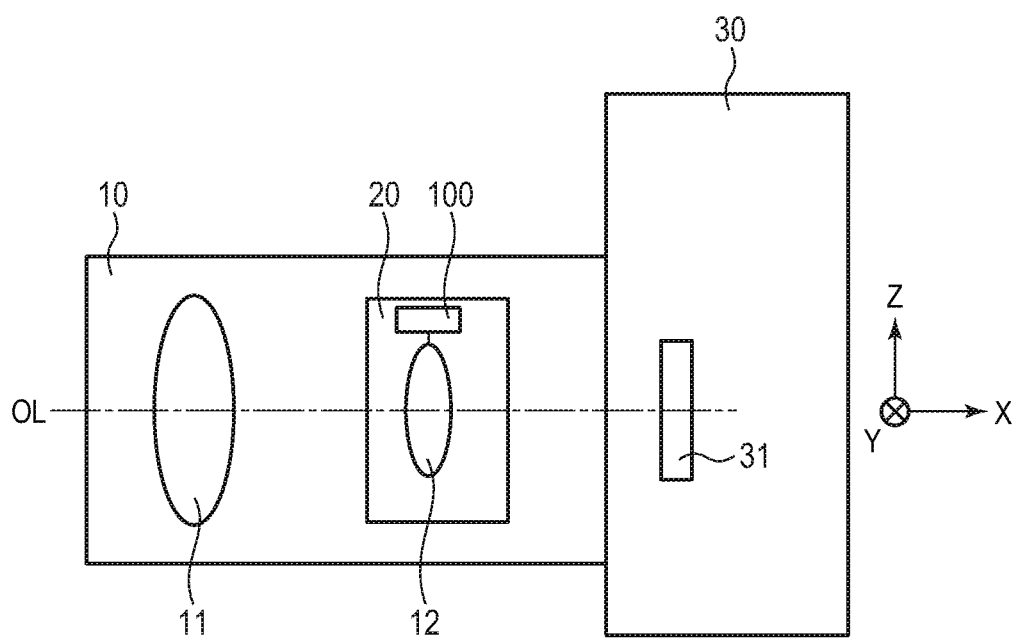
FIG. 5 is a schematic diagram of a digital camera.

FIG. 5 is a schematic view of a digital camera, and is an illustration of an example in which a driving device including the vibration wave motor 100 according to the first embodiment is applied to lens drive of the digital camera. The digital camera includes a lens unit 10 and a main body portion 30. The lens unit 10 includes a lens group 11 and the focus unit 20 including the lens group 12. Inside the focus unit 20, the vibration wave motor 100 and the lens group 12 are provided. The lens unit 10 is mounted to the main body portion 30. The main body portion 30 includes an image pickup element 31 configured to receive a light beam (optical axis OL), which has passed through the lens groups 11 and 12. With the configuration described above, focus detection is performed based on an image signal obtained from the image pickup element 31. Through control of the vibration wave motor 100 based on the result of focus detection, drive of the lens group 12 is controlled in the X-axis direction. The focus unit 20 corresponds to a driving device in the claims.

Figure 6:
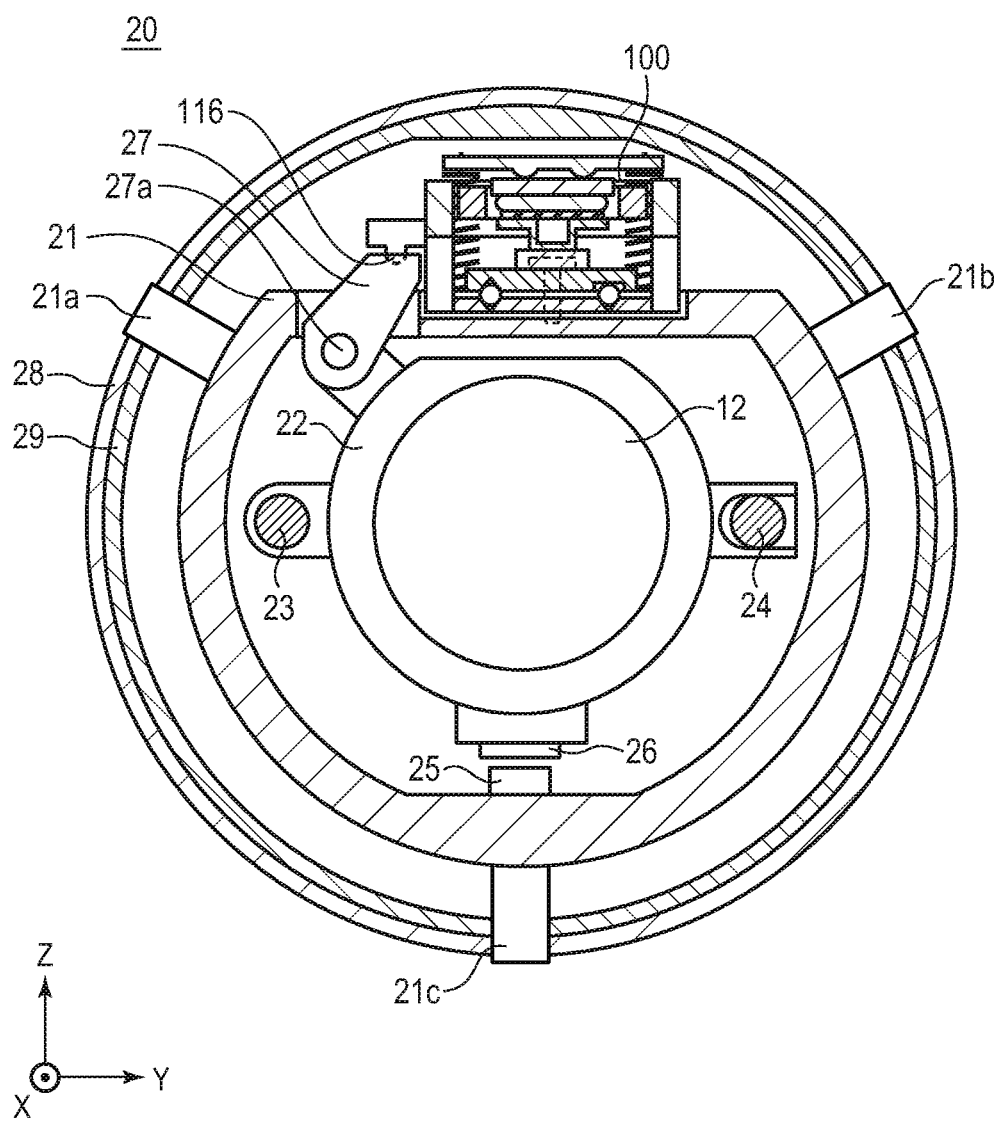
FIG. 6 is a sectional view for illustrating a configuration of a focus unit (20) in which the vibration wave motor (100) according to the first embodiment is mounted.

FIG. 6 is a sectional view for illustrating the focus unit 20 in which the vibration wave motor 100 is mounted, which is cut along a plane parallel to a YZ plane. In FIG. 6, the vibration wave motor 100 is held on the lens barrel 21. At the same time, the lens holding member 22, which is the driven unit to be driven by the vibration wave motor 100, is held inside the lens barrel 21. The lens holding member 22 holds the lens group 12. The lens holding member 22 including the lens group 12 corresponds to a driven unit in the claims.

Inside the lens barrel 21, guide bars 23 and 24 are provided and linearly guide the lens holding member 22 in the X-axis direction. A position detection sensor 25 is configured to detect a position of the lens holding member 22 in the X-axis direction. A position scale 26 is provided to the lens holding member 22 at a position at which the position scale 26 is opposed to the position detection sensor 25. The position detection sensor 25 reads position information of the position scale 26, thereby being capable of obtaining the position of the lens holding member 22 in the X-axis direction inside the lens barrel 21. The coupling member 27 transmits power generated by the vibration wave motor 100 in the X-axis direction to the lens holding member 22. Further, the coupling member 27 is held onto the lens holding member 22 so as to be turnable about the rotary shaft 27a and has, in particular, the turning force that allows counterclockwise rotation about the rotary shaft 27a. By the turning force, the coupling member 27 and the power extraction portion 116 of the vibration wave motor 100 are coupled to each other.

A cam barrel 28 and a straight guide barrel 29 are provided on the outer side of the lens barrel 21. A cam groove (not shown) is formed in the cam barrel 28, whereas a straight guide groove (not shown) is formed in the straight guide barrel 29. The straight guide barrel 29 is fitted into the cam barrel 28 so that an outer peripheral surface of the straight guide barrel 29 is held in contact with an inner peripheral surface of the cam barrel 28. The lens barrel 21 is engaged with the cam barrel 28 having the cam groove formed therein and the straight guide barrel 29 having the straight guide groove formed therein with cam followers 21a, 21b, and 21c of the lens barrel 21. As a result, the entire lens barrel 21 is configured so as to be movable in the X-axis direction along with a zoom operation of the lens unit 10.

With the configuration described above, the vibration wave motor 100 is arranged in the focus unit 20 of the lens unit 10. The lens group 12 corresponds to a focus lens of the lens unit 10. As illustrated in FIG. 5, the focus lens is driven by driving the vibration wave motor 100 based on the result of focus detection of the image pickup element 31 that is arranged inside the main body portion 30. In this manner, focusing is enabled.

Then, the vibration wave motor 100 is fixed to the lens barrel 21 with the fixing screws 117A and 117B through the fixing portions 114a and 114b formed in the vicinities of both ends of the fixed-side guiding member 114. Therefore, the mounting of the vibration wave motor 100 onto the lens barrel 21 is achieved with a smaller structure than those of related-art examples. Further, the fixing portions 114a and 114b are directly formed in the fixed-side guiding member 114. Therefore, the fixation of the vibration wave motor 100 with a small structure at low cost is achieved without requiring a dedicated member for fixing the vibration wave motor 100.

Further, when a driving device is configured with the vibration wave motor 200 according to the second embodiment, the same effects as those of the first embodiment are obtained.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-024868, filed Feb. 15, 2018, which is hereby incorporated by reference herein in its entirety.

What is claimed is:

1. A vibration wave motor comprising:
   a vibrator;
   a friction member, which is in friction contact with the vibrator;
   a pressurizing unit configured to pressurize the vibrator against the friction member; and
   a guiding unit configured to guide relative movement between the vibrator and the friction member, the guiding unit including:
   a first guiding member configured to be movable;
   a second guiding member configured to be fixed; and
   fixing portions formed in the second guiding member,
   wherein the relative movement between the vibrator and the friction member is caused by vibration generated by the vibrator,
   wherein the guiding unit holds the friction member,
   wherein the fixing portions are formed in the guiding unit in vicinities of both ends of the guiding unit sandwiching the friction member,
   wherein the fixing portions are provided for fixing the vibration wave motor to a driven unit having a driven portion which is driven by the relative movement, and
   wherein the second guiding member is between the first guiding member and the friction member.

2. The vibration wave motor according to claim 1, wherein the first guiding member is movable together with the vibrator, and the second guiding member is configured to hold the friction member and is fixed.

3. The vibration wave motor according to claim 1, wherein the guiding unit further comprises a rolling ball, and the rolling ball is sandwiched between the first guiding member and the second guiding member.

4. The vibration wave motor according to claim 1, wherein the vibrator has two projecting portions along the direction of the relative movement, and the fixing portions are formed in vicinity of a straight line that connects distal ends of the two projecting portions.

5. The vibration wave motor according to claim 1, wherein the fixing portions are formed in vicinity of a straight line that passes through a position at which the vibration wave motor is coupled to a coupling member and is parallel to the direction of the relative movement.

6. The vibration wave motor according to claim 1, wherein the vibration comprises high-frequency vibration at a frequency falling within an ultrasonic range, and the vibration wave motor comprises an ultrasonic motor.

7. A driving device, comprising:
   a vibration wave motor including:
      a vibrator;
      a friction member, which is in friction contact with the vibrator;
      a pressurizing unit configured to pressurize the vibrator against the friction member;
      a guiding unit configured to guide relative movement between the vibrator and the friction member, the guiding unit including:
         a first guiding member configured to be movable;
         a second guiding member configured to be fixed; and
         fixing portions formed in the second guiding member,
      wherein the relative movement between the vibrator and the friction member being caused by vibration generated by the vibrator, the guiding unit holding the friction member, the fixing portions being formed in vicinities of both ends of the guiding unit sandwiching the friction member; and
   a driven unit having a driven portion which is to be driven by the relative movement,
   wherein the fixing portions are configured to fix the vibration wave motor to the driven unit, and
   wherein the second guiding member is between the first guiding member and the friction member.

8. The driving device according to claim 7, wherein the driven unit comprises a lens unit, and the fixing portions are configured to fix the vibration wave motor to a lens barrel of the driving device.

* * * * *